United States Patent [19]

Kivits et al.

[11] Patent Number: 4,731,780
[45] Date of Patent: Mar. 15, 1988

[54] OPTICAL RECORDING ELEMENT

[75] Inventors: Petrus J. Kivits; Martinus M. Sens; René Dufour, all of Eindhoven, Netherlands

[73] Assignee: U.S. Philips Corporation, New York, N.Y.

[21] Appl. No.: 4,320

[22] Filed: Jan. 21, 1987

Related U.S. Application Data

[63] Continuation of Ser. No. 842,727, Mar. 20, 1986, which is a continuation of Ser. No. 662,652, Oct. 19, 1984, abandoned.

[30] Foreign Application Priority Data

Jul. 11, 1984 [NL] Netherlands ............... 8402193

[51] Int. Cl.⁴ ............................................. G11B 7/00
[52] U.S. Cl. ............................. 369/284; 369/286
[58] Field of Search ........................... 369/284, 286

[56] References Cited

U.S. PATENT DOCUMENTS 4,363,844 12/1982 Lewis et al. .................. 369/286
4,441,179 4/1984 Slaten ............................ 369/286

FOREIGN PATENT DOCUMENTS 2615605 10/1977 Fed. Rep. of Germany ...... 369/286
35741 3/1983 Japan ............................ 369/286
137147 8/1983 Japan ............................ 369/284

Primary Examiner—Steven L. Stephan
Attorney, Agent, or Firm—Norman N. Spain

[57] ABSTRACT

An optical recording element comprising an assembly of two parallel substrate plates made from a transparent synthetic resin and each comprising on their facing sides a recording layer which comprises a guide track in the form of a spiral-like groove, and a foil of sythetic resin which with both major surfaces engages or substantially engages the ridges of the recording layers present between the groove turns.

3 Claims, 3 Drawing Figures

OPTICAL RECORDING ELEMENT

This is a continuation of application Ser. No. 842,727, filed Mar. 20, 1986, which is a continuation of application Ser. No. 662,652, filed Oct. 19, 1984, now abandoned.

The invention relates to an optical recording element comprising an assembly of two parallel substrate plates made from a transparent synthetic resin and each comprising on their facing sides a recording layer which comprises a guide track in the form of a spiral-like groove, a slot-shaped space being present between the recording layers.

In a usual embodiment of such an optical recording element, at least one so-called spacer is provided between the two substrate plates. As a rule, two spacers are used, namely one annular spacer on the outer edge of the substrates and one annular spacer around a central hole present in the substrates. The spacers may be individual elements which are connected to the substrate plates on both sides, for example by gluing. It is also possible for the spacers to have for example the form of ring shaped projections which are connected integrally with each substrate plate, the end-faces which are welded or glued together.

As an example of a known construction. Reference may be made to European Patent Application Publ. No. 0094273. The slot-shaped space present between the recording layers is normally filled with air or another inert gas, for example, nitrogen. According to the current notions, this air- (gas-)filled spaced is essential for a good recording process. When information is recorded, the recording layer is exposed via the transparent substrate plate to laser light which is modulated in accordance with the information to be recorded. In the exposed places, variations in the recording layer take place which can be detected again afterwards by means of laser light. This so-called reading laser light is a continuous beam having a much weaker energy content than the modulated writing laser light beam. The nature of the provided variations depends on the type of recording layer. In a recording layer of, for example, a metal or of a chalcogenide such as notably an alloy of tellurium with other elements which are selected for example, from the group of Se, Sb, As, S, Pb, Sr, Bi, Ge, Ga, Si, Te, and In, holes are formed in the exposed places in the recording layer which have a raised edge portion or ridge. When a dye is used, cavities or holes having a raised edge portion are formed in the exposed places.

It will be obvious that in the formation of holes, cavities and the like, displacement of material occurs. Gaseous products may also be formed. Hence the considered necessity of the air-filled slot-shaped space between the recording layers. Another aspect of the air-filled slot-shaped space is the low thermal conductivity. As a result of this, a good signal-to-noise ratio is obtained already with a low laser writing energy. Briefly, the favourable recording properties seem to be considerbly related to the presence of the air-filled slot-shaped space.

Applicants have established that the above-described known optical recording element shows an insufficient mechanical rigidity.

It is the object of the invention to provide an optical recording element of the type mentioned in the opening paragraph which shows an excellent mechanical rigidity in combination with excellent recording properties and in particular a good recording sensitivity and a good signal-to-noise ratio.

This is achieved by means of a recording element as mentioned in the opening paragraph which is characterized in that a foil of a synthetic resin is clamped in the slot-shaped space between the recording layers and, with both major surfaces, engages or substantially engages the ridges of the recording layers present between the groove turns.

Due to the invention, the prejudice of the necessity of a gas-filled slot-shaped space is overcome.

In a favourable embodiment a foil which is metallized on both surfaces is used in the optical recording element according to the invention. By this means an optimalization of the signal-to-noise ratio can be achieved.

In a further favourable embodiment the outer edge and/or the central part of the foil is connected to the substrate plates present on each side by a glued or welded joint.

The invention will be described in greater detail by means of the drawing, in which the figures are not drawn to scale and:

Figure 1:
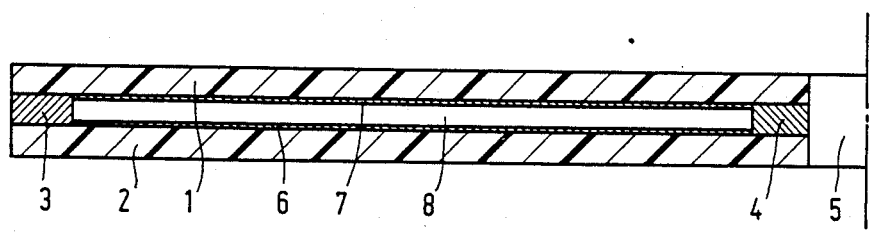
FIG. 1 is a cross-sectional view of a prior art optical recording element.

Reference numerals 1 and 2 in FIG. 1 denote two parallel substrate plates of a synthetic resin. The plates are connected together by using an annular spacer 3 near the edge of the plates and an annular spacer 4 provided around the central hole 5. The inner surface of each plate comprises recording layers 6 and 7, respectively. A slot-shaped space 8 filled with a gas, generally air, is present between the recording layers 6, 7.

Figure 2:
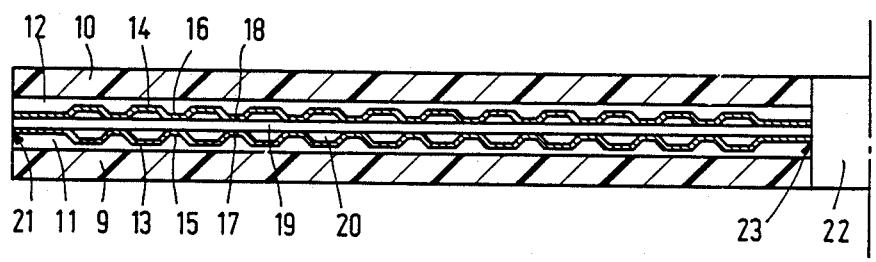
FIG. 2 is a cross-sectional view of a recording element according to the invention.

In the recording element shown in FIG. 2 there are two parallel substrate plates 9 and 10 manufactured from a transparent synthetic resin, for example, polymethylmethacrylate or polycarbonate. Substrate plates 9 and 10 comprise on their inner and opposing surfaces synthetic resin layers 11 and 12, respectively. These synthetic resin layer may be, for example, a U.V.-light-cured layer of acrylates. Both synthetic resin layers 11, 12 comprise a spiral-like guide track in the form of grooves 13 and 14, respectively. Between the groove turns there are ridges 15 and 16, respectively. The synthetic resin layers 11, 12 are covered with recording layers 17 and 18, respectively, following the contours of grooves 13 and 14, respectively.

The recording layer may be manufactured from a variety of materials. A suitable recording material in which upon radiation with pulsated laser light, holes or cavities are formed, is a chalcogenide material, in particular a tellurium alloy, for example, an alloy of tellurium with one or two elements selected from the group Se, Sb, As, S, Pb, Sn, Bi, Ge, Ga, Si, Tl and In. Such a chalcogenide material may also be used for an erasable, optical recording of information. In that case a conversion from amorphous to crystalline, or reverse, takes place in the exposed places. The changes can be traced by weak laser light. The variations can be made undone by means of a thermal treatment so that the recorded information is erased. An example of another type of a recording layer is a layer of dye in which cavities are formed and/or discoloured spots are formed by exposure to laser light.

In the FIG. 2, synthetic resin layers 11, 12 are shown as individual layers. It is also very well possible to use a substrate plate having a surface in which the guide track has already been provided. Such a grooved substrate plate can be manufactured in a simple manner by means of an injection moulding process.

A synthetic resin foil 19 is clamped between the recording layers 17, 18. The synthetic resin foil 19 engages the recording layers 17, 18 at the area of the ridges. At the area of the groove turns a space 20 filled with a gas, for example air, is present between the foil 19 and the recording layers 17, 18. The optical recording element according to the invention shown in FIG. 2 has a large mechanical rigidity caused in that there is a sandwich structure the central part of which, in this case the foil 19, experiences over a large part of the two major surfaces, a large frictional force from the surfaces of the two recording layers 17, 18. The foil is manufactured, by way of example, from polymethylmethacrylate, polycarbonate, polyvinyl chloride or polyester. The thickness of the foil is, for example, between 5/μm and 0.5 mm, for example, 0.3 mm.

The outer edge 21 of the foil 19 and/or the inner edge 23 situated around the central aperture 22, is connected to the recording layers 17 and 18. A suitable connection is, for example, a welded joint which may be provided in accordance with methods known per se. A suitable method is ultrasonic welding. A glued joint may also be used. The foil 19 may also be connected to the recording layers 17, 18 at the area of the ridges 15, 16. In this case also a welded or glued joint may be used. At a glued joint it should be ensured that the glue does not fill the spaces 20.

The recording sensitivity is high. The same applies to the signal-to-noise ratio. If a dye is used as a recording material, a good recording on the ridges 15, 16 of the recording layers 17, 18 is possible, except when said ridges are glued to the foil 19.

When a metallized foil is used, the extra advantage is obtained that the recording element at the area of the groove can be brought in an antireflection condition so that the signal-to-noise ratio is further improved.

Figure 3:
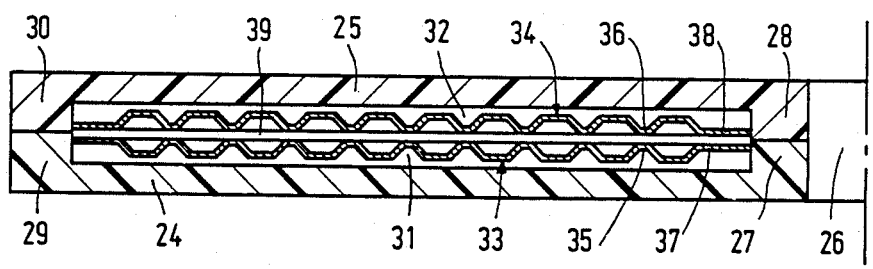
FIG. 3 is a cross-sectional view of another embodiment of a recording element according to the invention.

In the recording element shown in FIG. 3 there are present two substrate plates 24 and 25 manufactured from a transparent synthetic resin. The plates 24, 25 comprise around the central hole 26 moulded, hence integral, ridges 27 and 28, respectively. The outer edge of the plates 24 and 25 also comprises ridges 29, 30. Between the outer and inner ridges the surface of plates 24 and 25 comprises a UV-light cured transparent layer of acryl synthetic resin 31, 32, in which guide tracks 33, 34 are provided in the form of a spiral-like groove.

Bridge parts (ridges) 35, 36 are present between the turns of the groove. Recording layers 37, 38 are provided over the thus structured surface of the transparent layers 31, 32. The recording layers are manufactured from a TeSe alloy to which other elements, in particular Sb, As, S, Sn, Pb, Bi may have been added. A synthetic resin foil 39 is clamped between the recording layers 37, 38, both major surfaces of the foil engaging the bridge parts 35, 36. In the same manner as shown in the FIG. 2 embodiment, information is recorded in the groove parts of recording layers 37, 38, i.e. in the bottom of grooves 33 and 34, respectively. For this purpose, the recording layers are exposed to pulsated laser light which is focused on the recording layers via the substrate plates 24, 25. Information bits in the form of holes, not shown in FIG. 3, are formed in the exposed places. The recording sensitivity and the signal-to-noise ratio are good. The optical recording element shown in FIG. 3 moreover has an excellent mechanical rigidity and strength which are such that variations in temperature, air pressure and humidity do not result in warping of the element.

What is claimed is:

1. An optical recording element comprising an assembly of two parallel substrate plates, each of said plates being made of a transparent synthetic resin and each of said plates comprising on their mutually opposing surfaces a guide track provided with a spiral-like groove and ridges between the turns of said groove, and a recording layer, situated upon and following the contours of said guide track and a slot-shaped gap present between said recording layers, characterized in that a foil of a synthetic resin is present in said gap, is sandwiched between said recording layers and engages essentially only the portions of the recording layers present on said ridges, said foil, when adhering to said recording layers, adheres only at the areas of said recording layers not in contact with said guide tracks and that said recording element is capable of recording information by radiation of said recording layers with modulated laser light through said substrate plates thereby to form in the resultant exposed areas of said recording layers light detectable changes.

2. An optical recording element as claimed in claim 1, characterized in that a foil is used which is metallized on both surfaces.

3. An optical recording element as claimed in claim 1, characterized in that the foil is connected to the substrate plates present on each side on the outer edge and/or in the central part by means of a glued joint or a welded joint.

* * * * *